UNITED STATES PATENT OFFICE.

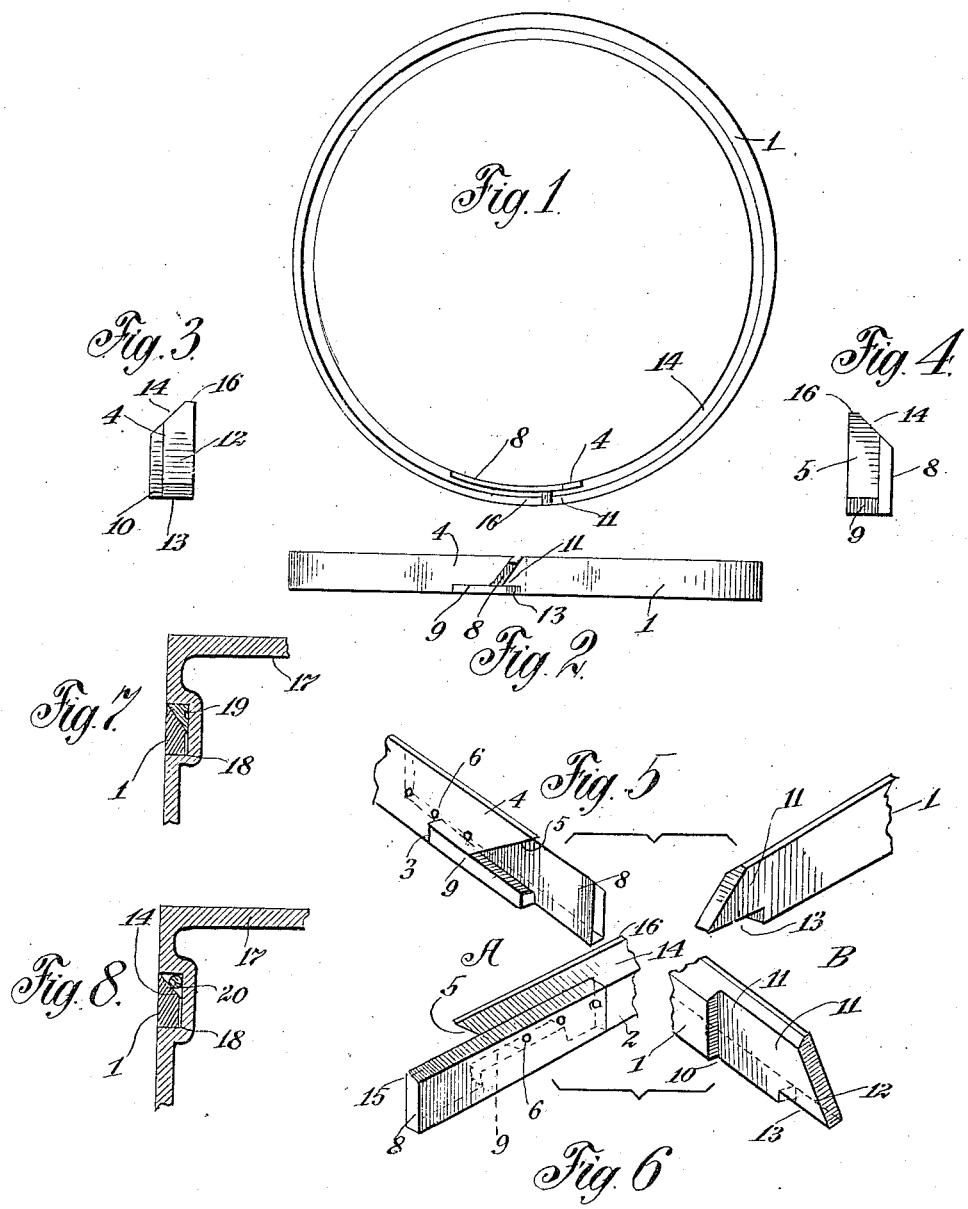

HENRY SCHMITT, OF DETROIT, MICHIGAN.

PISTON-RING.

1,267,703.  Specification of Letters Patent.  Patented May 28, 1918.

Application filed April 5, 1917.  Serial No. 159,869.

*To all whom it may concern:*

Be it known that I, HENRY SCHMITT, a citizen of the United States of America, residing at Detroit, in the county of Wayne and State of Michigan, have invented certain new and useful Improvements in Piston-Rings, of which the following is a specification, reference being had therein to the accompanying drawings.

In piston rings of the split type, it is customary to provide a joint or filler member coöperatively associated with the ends of a ring to insure a tight joint. Although various designs of joint members have been provided they have been found objectionable for reasons such as being impractical from a manufacturing standpoint, not insuring leak-proof joints, and particularly because many of the joints, due to relative radial movement of the ends of the ring or to slight movements of the joint member as the ring expands to wear, cause scratching and scoring of the cylinder walls.

My invention aims to provide a piston packing ring of the split type that may be employed in connection with engines for the purpose of preventing leakage of gases under high pressure past the piston and for insuring the full compression in cylinders necessary in internal combustion engines. The piston packing ring is constructed so that it will be leak-proof and at the same time not mar or groove cylinder walls under any conditions of usage.

My invention further aims to provide a split eccentric ring of greater thickness in the region intermediate the end portions of the ring, so as to insure against twisting or warping and provide a greater degree of resiliency or distention when the ring is confined within a groove or holder of a piston.

My invention further aims to provide simple and effective means, in a manner as hereinafter set forth, for causing the piston ring to constantly adjust itself relative to a cylinder wall in a piston to compensate for wear, and this and other features of my invention will hereinafter more fully appear by reference to the drawing and the detail description thereof.

In the drawing,

Figure 1 is a side elevation of a piston ring;

Fig. 2 is a plan of the same;

Figs. 3 and 4 are views of the ends of the ring;

Fig. 5 shows perspective views of the outer sides of the ends of the ring;

Fig. 6 shows similar views of the inner sides of the ends of the ring;

Fig. 7 is a sectional view of a portion of a piston showing the packing ring in cross section, and associated with an expansible member, and Fig. 8 is a similar view showing a modified form of expansible member.

The piston packing ring comprises a metallic resilient member having a comparatively thick region or portion intermediate the ends thereof, with the cross sectional area of the member gradually decreasing to the ends of the member. The inner annular wall of the member is therefore eccentrically disposed relative to the outer wall of the member and said member may be conveniently termed an eccentric split ring.

Considering that end of the member generally designated A, the inner wall of the member is cut away for its full depth to provide a recess 2 and an edge of the member is undercut, as at 3, so as to leave a thin extremity 4 which has the ends thereof beveled or tapered toward the undercut 3 of the member. Connected to the extremity 4 by rivets 6 or other fastening means, is a guide member 8 set into the recess 2 and protruding from the beveled extremity 4. The guide member 8 has a longitudinal ledge 9 of less length than the guide member and this ledge fills in the undercut 3 and confronts the beveled edge of the extremity 4.

Considering the opposite end of the member, generally denoted B, the inner wall of said member is recessed, as at 10, to receive the guide member 8 and by recessing the end B, there is formed a tongue 11 adapted to ride or shift upon the guide member 8. The tongue 11 is beveled or tapered, as at 12, and cut away, as at 13, so that the end of the tongue will conform to the shape afforded by the walls of the extremity 4 and the ledge 9 of the guide member 8. In other words, the end of the tongue 11, is designed for matched relation and possible contact with the extremity 4 and the ledge 9, and when the tongue 11 rests upon the guide member 8, there is a sealed joint, insomuch that the end B of the ring overlaps the end A.

The inner wall of the member 1 and preferably what may be termed the upper edge thereof is beveled, as at 14, and this beveled surface naturally extends on to the guide member 8 and causes this member to be beveled, as at 15. The beveled portion of the member 1 leaves a comparatively thin upper edge 16 on said member, thereby not decreasing the width of the outer wall of the member 1 which confronts the wall of a cylinder.

Reference will now be had to Figs. 7 and 8, showing a portion of a piston 17 having a groove or holder 18 for the piston packing ring. Associated with the ring is an expansion member 19, which is also in the form of a split ring, and as shown in Fig. 7 is preferably triangular in cross section. The expansion member 19 sets in the upper portion of the groove or holder 18 and constantly exerts a pressure against the beveled face 14 of the piston ring, causing said ring to snugly engage the walls of the cylinder in which the piston is placed. The member 19 will cause the piston ring to be distended outwardly and downwardly, and as a substitute for the member 19, there may be a split expansible ring 20, as shown in Fig. 8. In either instance, the members 19 and 20 will tend to separate the ends A and B of the piston packing ring, and with said ring distended against the walls of the cylinder there will be no chance of leakage between the ring and the cylinder wall.

What I claim is:—

A piston packing ring, comprising a split eccentric member having ends A and B, the end A having its inner wall provided with a recess and an edge undercut to provide a thin extremity, a guide member connected to the thin extremity of the end A and protruding from the extremity, a ledge carried by said guide member and of less length than said guide member, and extending under said extremity, and the end B of said eccentric member having the inner wall thereof, recessed to receive the guide member of the end A, the recessing of the end B providing a tongue to ride against the guide member of the end A and said tongue having a shape for matched relation with the extremity and ledge of the end A when said tongue rests on the guide member of the end A, said eccentric member and said guide member having the inner walls thereof beveled.

In testimony whereof I affix my signature in the presence of two witnesses.

HENRY SCHMITT.

Witnesses:
ANNA M. DORR,
LEWIS E. FLANDERS.